(12) United States Patent
Kume et al.

(10) Patent No.: US 8,288,493 B2
(45) Date of Patent: Oct. 16, 2012

(54) (METH)ACRYLIC-MODIFIED SILOXANE COMPOUNDS

(75) Inventors: Hiroyuki Kume, Annaka (JP); Masahiko Minemura, Annaka (JP); Mamoru Hagiwara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 641 days.

(21) Appl. No.: 12/425,593

(22) Filed: Apr. 17, 2009

(65) Prior Publication Data

US 2009/0270529 A1    Oct. 29, 2009

(30) Foreign Application Priority Data

Apr. 25, 2008   (JP) ................. 2008-115740

(51) Int. Cl.
*C08F 30/08* (2006.01)
(52) U.S. Cl. ....................................... 526/279
(58) Field of Classification Search .................. 526/279
See application file for complete search history.

(56) References Cited

U.S. PATENT DOCUMENTS

| | | | |
|---|---|---|---|
| 5,244,981 A | 9/1993 | Seidner et al. | |
| 5,593,787 A | 1/1997 | Dauth et al. | |
| 5,977,282 A | 11/1999 | Ebbrecht et al. | |
| 6,288,129 B1 | 9/2001 | Gruning et al. | |
| 6,933,401 B2 * | 8/2005 | Molock et al. | 556/437 |
| 2006/0258772 A1 * | 11/2006 | Sugihara et al. | 523/122 |

FOREIGN PATENT DOCUMENTS

| | | |
|---|---|---|
| JP | 11-315144 | 11/1999 |
| JP | 2001-98040 | 4/2001 |
| JP | 2004-149592 | 5/2004 |
| JP | 3963755 | 6/2007 |
| WO | 2004/081121 A1 | 9/2004 |

OTHER PUBLICATIONS

Japanese Office Action issued Apr. 18, 2012, in Patent Application No. 2008-115740.

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

Provided is a siloxane compound having one end modified with at least one (meth)acrylic group via a spacer, the spacer being a straight chain having at least three ether bonds or a branched structure having at least one ether bond. The (meth)acrylic-modified siloxane compound is added to a heat or photo-curable composition, which cures into a product exhibiting water repellent, antifouling, lubricating and other properties inherent to siloxane.

8 Claims, 6 Drawing Sheets

(METH)ACRYLIC-MODIFIED SILOXANE COMPOUNDS

CROSS-REFERENCE TO RELATED APPLICATION

This non-provisional application claims priority under 35 U.S.C. §119(a) on Patent Application No. 2008-115740 filed in Japan on Apr. 25, 2008, the entire contents of which are hereby incorporated by reference.

TECHNICAL FIELD

This invention relates to (meth)acrylic-modified siloxane compounds which are highly compatible with and added to various heat or photo-curable compositions such as film-forming compositions and resin compositions, which cure into products exhibiting intrinsic properties of siloxane such as water repellent, antifouling and lubricating properties. It also relates to curable compositions comprising the same.

BACKGROUND ART

In general, organopolysiloxanes are admixed in various compositions such as coating and resinous compositions since they are effective in imparting or enhancing some properties like antifoaming, water repellent, parting, antifouling, lubricating, heat resistant, freeze resistant, electrically insulating, and flame retardant properties. Particularly, polyether-modified siloxanes in the form of hydrophobic polysiloxane combined with hydrophilic polyether are further effective in promoting emulsification and dispersion of resin components in coating compositions. As for (meth)acrylic-modified siloxanes in the form of polysiloxane having heat or photo-curable (meth)acrylic groups bonded thereto, cured compositions exhibit persistent polysiloxane properties because the siloxane is incorporated in the cured compositions via chemical bonds. Thus polyether-modified siloxanes and (meth)acrylic-modified siloxanes are useful in a variety of applications including coating, ink and resin compositions as coating additives (e.g., leveling, antiblocking, dispersing and antifoaming agents), surface treating agents for imparting water repellency, heat stability, lubricity and flexibility, or resin modifiers.

However, some polyether-modified siloxanes having a high content of hydrophilic polyether group are not dissolved in hydrophobic coating compositions and are insufficient to manifest and maintain antifouling and other functions. Even in the case where polyether-modified siloxane is fully compatible with a resinous component in a coating or resinous composition prior to curing, when the composition is cured, the resinous component can become less compatible with the polyether-modified siloxane due to a change of water content during curing or a molecular weight buildup with the progress of curing reaction. Then such phenomena as surface delamination, weak adhesion and color shading can occur in the cured product.

On the other hand, (meth)acrylic-modified siloxanes are less soluble in coating compositions, separable therefrom, and less reactive with other curable components. The coating compositions become less antifoaming or dispersible and lack storage stability.

A composition comprising a siloxane compound having both polyether and (meth)acrylic groups is reported as overcoming the drawbacks of the polyether-modified siloxane and (meth)acrylic siloxane.

Namely, JP 3963755 describes a polyurethane composition comprising a silicone modified with both polyether and methacrylic carbonyloxy groups as an internal parting agent. However, when the silicone has methacrylic groups at both ends of a siloxane link, it rather functions as a crosslinking agent and is unlikely to exhibit parting, antifouling and lubricating properties.

JP-A 2004-149592 discloses a resin composition (for decorative boards) comprising a polyether-modified silicone having an acryloxy or methacryloxy group and a polyoxyalkylene group. However, only siloxane compounds having (meth)acrylic groups on side chains and both ends are shown in Examples. They also function as a crosslinking agent and are unlikely to exhibit siloxane properties. When a number of (meth)acrylic groups are included within the molecule, siloxane compounds can become gelled, making it difficult to control physical properties of the cured composition.

Although curable compositions comprising a modified silicone having both (meth)acrylic and polyether groups bonded thereto are known in the art, compounds capable of exhibiting siloxane properties to a full extent and compositions comprising the same are not yet available.

SUMMARY OF INVENTION

An object of the invention is to provide (meth)acrylic-modified siloxane compounds which are highly compatible with and added to various heat or photo-curable compositions such as film-forming compositions and resin compositions, which cure into products exhibiting water repellent, antifouling, lubricating and other intrinsic properties of siloxane to a full extent; and curable compositions comprising the same.

The inventors have found that a (meth)acrylic-modified siloxane compound is obtained by modifying a siloxane compound at one end with at least one (meth)acrylic group. A spacer intervenes between the siloxane and the (meth)acrylic group and is a straight chain having at least three ether bonds or a branched structure having at least one ether bond. This (meth)acrylic-modified siloxane compound is highly compatible with a heat or photo-curable composition such as a film-forming composition or resin composition. The composition having the (meth)acrylic-modified siloxane compound added thereto, when cured, exhibits water repellent, antifouling, lubricating and other intrinsic properties of siloxane to a full extent.

Accordingly, the invention in one aspect provides a siloxane compound having one end modified with at least one (meth)acrylic group via a spacer, the spacer being a straight chain having at least three ether bonds or a branched structure having at least one ether bond.

Typically the (meth)acrylic-modified siloxane compound has the structural formula (1):

wherein $R^1$ is each independently a monovalent $C_1$-$C_{30}$ organic group, $R^2$ is $C_2$-$C_6$ oxyalkylene, $R^3$ is an organic group of straight or branched structure which is terminated with one to three (meth)acrylic groups and may further have a spacer, i has a value from 1 to 500, and j has a value of 2 to 60 in the case of straight structure or 0 to 60 in the case of branched structure.

In a preferred embodiment, the (meth)acrylic-modified siloxane compound has the structural formula (2) or (3).

Herein $R^1$, $R^4$ and i are as defined above.

In another preferred embodiment, the (meth)acrylic-modified siloxane compound has the structural formula (4) or (5).

Herein $R^1$, $R^2$, $R^4$, and i are as defined above, j and k each have a value of 0 to 60 and j and k may be the same or different, but are not equal to 0 at the same time.

The (meth)acrylic-modified siloxane compound preferably has a HLB value of up to 12.

In another aspect, the invention provides a curable composition comprising the (meth)acrylic-modified siloxane compound defined above. In the curable composition, the siloxane compound is preferably present in an amount of 0.5 to 60% by weight based on curable components excluding non-reaction-participant components. The curable composition is typically an antifouling coating composition or a transparent coating composition for electronic materials.

ADVANTAGEOUS EFFECTS OF INVENTION

The (meth)acrylic-modified siloxane compound is highly compatible with a curable composition such as a film-forming composition or resin composition and advantageously added thereto. The cured composition having the (meth)acrylic-modified siloxane compound added thereto fully exhibits intrinsic properties of siloxane such as water repellent, antifouling, and lubricating properties.

DESCRIPTION OF EMBODIMENTS (Meth)Acrylic-Modified Siloxane

The (meth)acrylic-modified siloxane compound is a siloxane compound which is modified at one end with at least one (meth)acrylic group via a spacer. The spacer between the siloxane and the (meth)acrylic group is a straight chain having at least three ether bonds or a branched structure having at least one ether bond.

As employed herein, the terminology "(meth)acrylic" is intended to mean "acrylic or methacrylic". The (meth)acrylic group is a group of the structure:

wherein $R^4$ is hydrogen or methyl. If (meth)acrylic groups are bonded to both ends and/or side chains of a siloxane molecular chain, the siloxane serves as a crosslinking agent in a curable composition. Since the siloxane is then unlikely to emerge at the cured product surface, the cured product shows little of siloxane intrinsic properties including antifoaming, water repellent, hydrophilic, parting, antifouling and lubricating properties.

Thus (meth)acrylic groups must be bonded to only one end of a siloxane molecular chain. The number of (meth)acrylic groups bonded to one end of a siloxane molecular chain is at least 1, preferably 1 to 3, and more preferably 1 or 2. Absent (meth)acrylic groups, polyether-modified siloxane's characteristics manifest explicitly, that is, siloxane compounds may be insoluble in hydrophobic solvents or deficient in development and maintenance of an antifouling or similar function after curing. When an acrylic-free siloxane compound is added to a curable composition, it becomes less compatible with the composition with the progress of curing reaction and is not incorporated in the cured composition through chemical bonds. Then unwanted phenomena such as surface delamination, weak adhesion and color shading occur in the cured composition. If the number of (meth)acrylic groups is more than 3, such a siloxane compound may serve as a crosslinking agent in a curable composition, resulting in a cured product showing little of siloxane intrinsic properties.

If no ether bond is included in the spacer between the siloxane molecular chain and the (meth)acrylic group, a modified siloxane compound may be incompatible with other components contributing to cure such as macro-monomers and prepolymers, resulting in a cured composition becoming white cloudy, and even the modified siloxane compound itself may become non-reactive.

Thus the spacer between the siloxane molecular chain and the (meth)acrylic group must contain an ether bond. The number of ether bonds in the spacer between the siloxane molecular chain and the (meth)acrylic group is at least 3 when the spacer is of straight chain structure and at least 1 when the spacer is of branched structure. An optimum number of ether bonds may be selected depending on the siloxane chain length and other components in the composition. A spacer of straight chain structure containing less than 3 ether bonds may exert little spacer effect. A spacer of straight chain structure containing more than 60 ether bonds is undesired because of a high viscosity to interfere with working. A spacer of branched structure containing no ether bond may exert no spacer effect. A spacer of branched structure containing more than 60 ether bonds is also undesired because of a high viscosity to interfere with working.

Typically the (meth)acrylic-modified siloxane compound is represented by the structural formula (12).

(12)

Herein $R^1$ is each independently a monovalent $C_1$-$C_{30}$ organic group, $R^2$ is $C_2$-$C_6$ oxyalkylene, $R^3$ is an organic group of straight or branched structure which is terminated with one to three (meth)acrylic groups and may further have a spacer, i has a value from 1 to 500, and j has a value of 2 to 60 in the case of straight structure and 0 to 60 in the case of branched structure.

In structural formula (12), $R^1$ may be the same or different at each occurrence and is selected from monovalent organic groups, preferably monovalent $C_1$-$C_{30}$ organic groups, and more preferably monovalent $C_1$-$C_8$ hydrocarbon groups. Examples include alkyl groups such as methyl, ethyl, propyl, butyl, hexyl and decyl, cycloalkyl groups such as cyclohexyl, aryl groups such as phenyl and tolyl, and aralkyl groups such as benzyl. For ease of preparation and a propensity to exhibit siloxane intrinsic properties, alkyl groups are preferred, with methyl being most preferred.

In structural formula (12), i is an integer from 1 to 500, preferably 5 to 200, and more preferably 10 to 150. With i values of less than 1, siloxane intrinsic properties do not develop whereas values of i in excess of 500 lead to drawbacks of poor curability and incompatibility with non-silicone monomers.

In structural formula (12), $R^2$ is $C_2$-$C_6$ oxyalkylene, examples of which include —$CH_2CH_2O$—, —$CH_2CH(CH_3)$ O—, —$CH_2CH_2CH_2O$—, —$CH_2C(CH_3)_2O$—, —$CH_2C(CH_3)_2CH_2O$—, and —$CH_2C(CH_3)_2CH_2CH_2O$—. For ease of preparation and hydrophilicity, —$CH_2CH_2O$— (ethylenoxy), —$CH_2CH(CH_3)O$—, and —$CH_2CH_2CH_2O$— (propylenoxy) are preferred.

In structural formula (12), $R^3$ is an organic group of straight or branched structure which is terminated with one to three (meth)acrylic groups and may further have a spacer. An organic group of branched structure ensures that more (meth)acrylic groups capable of chemical bond with a curable composition are provided without detracting from the intrinsic properties of siloxane. If a spacer is included at a terminal side of branched structure, the (meth)acrylic end group has an increased freedom to facilitate a chance of chemical bond in the cured composition.

Exemplary branched structures are illustrated below.

From the point of view described above, those of structural formulae (13) or (14) and (15) or (16) are preferred among the (meth)acrylic-modified siloxane compounds of structural formula (12).

(13)

Herein $R^1$ is each independently a monovalent $C_1$-$C_{30}$ organic group, $R^4$ is hydrogen or methyl, and i has a value from 1 to 500.

(14)

Herein $R^1$ is each independently a monovalent $C_1$-$C_{30}$ organic group, $R^4$ is hydrogen or methyl, and i has a value from 1 to 500.

(15)

Herein $R^1$ is each independently a monovalent $C_1$-$C_{30}$ organic group, $R^2$ is $C_2$-$C_6$ oxyalkylene, $R^4$ is hydrogen or methyl, and i has a value from 1 to 500, j and k each have a value of 0 to 60 and j and k may be the same or different, but are not equal to 0 at the same time.

(16)

Herein $R^1$ is each independently a monovalent $C_1$-$C_{30}$ organic group, $R^2$ is $C_2$-$C_6$ oxyalkylene, $R^4$ is hydrogen or methyl, and i has a value from 1 to 500, j and k each have a value of 0 to 60 and j and k may be the same or different, but are not equal to 0 at the same time.

The (meth)acrylic-modified siloxane compounds preferably have a hydrophilic-lipophilic balance (HLB) value of up to 12, and more preferably 1 to 10. With HLB values of up to 12, improved compatibility with a curable composition is expectable without a loss of siloxane intrinsic properties.

The method of preparing a (meth)acrylic-modified siloxane compound is not particularly limited. For example, a one end hydrogensiloxane is reacted with a polyether having hydroxyl and alkenyl groups, followed by dehydrochlorination using (meth)acrylic chloride. An alternative method is dehydration condensation using (meth)acrylic acid and an acid catalyst.

Curable Composition

The (meth)acrylic-modified siloxane compound is added to a variety of curable resin compositions such as film-forming compositions and resinous compositions. Suitable curable resin compositions include thermosetting resin compositions which will cure by heating and photo-curable resin compositions which will cure upon exposure to ultraviolet radiation or electron beam.

The curable resin compositions comprise components participating in reaction including (A) the (meth)acrylic-modified siloxane compound and (B1) a polymerizable prepolymer and/or (B2) a polymerizable monomer, and components not participating in reaction including solvents and additives such as leveling agents, pigments, colorants, defoamers (exclusive of the (meth)acrylic-modified siloxane compound), and solid additives, which are optional. Further (C1) a radical polymerization initiator and/or (C2) a photo polymerization initiator may be added to the curable resin compositions for facilitating photo- or heat-cure reaction.

B1. Polymerizable Prepolymer

In the curable composition, the polymerizable prepolymer (B1) serves as a base resin with which component (A) is to react. Suitable prepolymers include prepolymers having radical polymerizable unsaturated groups and prepolymers having cation polymerizable functional groups.

Exemplary prepolymers having radical polymerizable unsaturated groups include polyester(meth)acrylates, urethane(meth)acrylates, epoxy(meth)acrylates, melamine (meth)acrylates, triazine(meth)acrylates, and polyvinyl pyrrolidone.

Exemplary prepolymers having cation polymerizable functional groups include epoxy resins such as bisphenol epoxy resins, novolac epoxy resins, and alicyclic epoxy resins, vinyl ether resins such as aliphatic vinyl ethers, aromatic vinyl ethers, urethane vinyl ethers, and ester vinyl ethers, cyclic ether compounds, and spiro compounds.

These prepolymers typically have a molecular weight of up to 10,000. A molecular weight in excess of 10,000 is undesired because the cured resin layer may lack some surface properties including mar resistance, wear resistance, chemical resistance and heat resistance.

B2. Polymerizable Monomer

A polymerizable monomer (B2) may also be used as the base resin in the curable composition. Suitable polymerizable monomers include mono- and/or poly-functional radical polymerizable monomers having a radical polymerizable unsaturated group.

Examples of suitable radical polymerizable monomers include (1) unsaturated aromatic monomers such as styrene, vinylpyridine, vinylnaphthalene, and derivatives thereof; (2) unsaturated carboxylic acids such as acrylic acid, methacrylic acid, maleic anhydride, itaconic acid, fumaric acid, and derivatives thereof; (3) unsaturated carboxylic acid esters such as methyl, ethyl, propyl, butyl, 2-ethylhexyl, cyclohexyl, dodecyl, octadecyl and glycidyl esters of acrylic and methacrylic acid, and mono- and di-esters of maleic acid, maleic anhydride, itaconic acid, chrotonic acid and fumaric acid, and mono-, di- and tri-glycidyl esters of butene tricarboxylic acid; (4) vinyl esters such as vinyl acetate and vinyl propionate; (5) vinyl ethers such as vinyl methyl ether; (6) unsaturated nitriles such as acrylonitrile and methacrylonitrile; (7) halogenated vinyls and vinylidenes such as vinyl chloride, vinylidene chloride; (8) unsaturated alcohols such as vinyl alcohol and allyl alcohol; (9) unsaturated amides such as acrylic amide and methacrylic amide and unsaturated amines such as aminoacrylate and aminomethacrylate; (10) unsaturated isocyanates such as vinyl isocyanate and allyl isocyanate; and (11) unsaturated cyclic iminoethers such as 2-vinyl-2-oxazoline and 2-isopropenyl-2-oxazoline.

Monomers having a cation polymerizable functional group are also useful and include those monomers from which the prepolymers having cation polymerizable functional groups are obtained.

Of these monomers, acrylic acid, methacrylic acid and derivatives thereof such as methyl acrylate, methyl methacrylate, hydroxyethyl methacrylate (HEMA), glycidyl acrylate, glycidyl methacrylate and maleic anhydride, 2-vinyl-2-oxazoline, and 2-isopropenyl-2-oxazoline are preferred from the standpoint of compatibility of end groups. These monomers may be used alone or in admixture.

C1. Radical Polymerization Initiator

The radical polymerization initiator is used such that when the curable composition is heated for curing, the initiator may generate free radicals which trigger radical polymerization.

As the radical initiator, those commonly used in the art may be employed. Exemplary radical initiators include (1) peroxides such as cumyl peroxide, tert-butyl peroxide, acetyl peroxide, propionyl peroxide, benzoyl peroxide, chlorobenzoyl peroxide, 2,4-dichlorobenzoyl peroxide, 4-bromomethylbenzoyl peroxide, lauroyl peroxide, potassium persulfate, diisopropyl peroxycarbonate, tetraphosphorus hydroperoxide, 1-phenyl-2-methylpropyl-1-hydroxyperoxide, tert-butyl triphenylperacetate, tert-butyl peracetate, tert-butylhydroperoxide, tert-butyl perbenzoate, tert-butyl performate, tert-butyl phenylperacetate, tert-butyl 4-methoxyperacetate, and tert-butyl N-(3-toluyl)percarbamate; (2) azo compounds such as 2,2'-azobispropane, 2,2'-dichloro-2,2'-azobispropane, 1,1'-azo(methylethyl)diacetate, 2,2'-azobis(2-amidinopropane)hydrochloride, 2,2'-azobis(2-amidinopropane)nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2,2'-azobis-2-methylvaleronitrile, 2-(4-bromophenylazo)-2-allylmalonodinitrile, dimethyl 4,4-azobis-4-cyanovalerate, 2,2-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-phenylethane, 1,1'-azobis-cumene, ethyl 4-nitrophenylazobenzylcyanoacetate, (phenylazo)diphenylmethane, (phenylazo)triphenylmethane, 4-nitrophenylazotriphenylmethane, 1,1'-azobis-1,2-diphenylmethane, poly(bisphenol A-4,4'-azobis-4-cyanopentanoate) and poly(tetraethylene glycol-2,2'-azobisisobutyrate); and (3) other compounds such as 1,4-bis(pentaethylene)-2-tetrazene, benzenesulfonylazide, 1,4-dimethoxycarbonyl-1,4-diphenyl-2-tetrazene.

The amount of component (C1) used varies with a particular application and is preferably 0 to 50 parts and more preferably 0 to 10 parts by weight per 100 parts by weight of components (A), (B1) and (B2) combined.

C2. Photo-Polymerization Initiator

The photo-polymerization initiator is used such that when the curable composition is exposed to UV or EB for curing, the initiator may generate free radicals which trigger radical polymerization.

As the photo-polymerization initiator, those commonly used in the art may be employed. Exemplary initiators include (1) 2-hydroxy-2-methyl-1-phenylpropan-1-one (Darocure 1173 by Merck), 1-hydroxycyclohexylphenylketone (Irgacure 184 by Ciba Geigy), 1-(4-isopropylphenyl)-2-hydroxy-2-methyl-propan-1-one (Darocure 1116 by Merck), benzyl methyl ketal (Irgacure 651 by Ciba Geigy), 2-methyl-1-[4-(methylthio)-phenyl]-2-morpholinopropanone-1 (Irgacure 907 by Ciba Geigy), a mixture of 2,4-diethylthioxanthone (Kayacure DETX by Nippon Kayaku Co., Ltd.) and ethyl p-dimethylaminobenzoate (Kayacure EPA by Nippon Kayaku Co., Ltd.), and a mixture of isopropylthioxanthone (Quantacure ITX by Ward Blekinsop) and ethyl p-dimethylaminobenzoate.

The amount of component (C2) used varies with a particular application and is preferably 0 to 30 parts and more preferably 0 to 10 parts by weight per 100 parts by weight of components (A), (B1) and (B2) combined. The photo-polymerization initiator is not necessarily needed in the case of EB cure, while it is desirably added in an amount of 0 to 10 pbw in the case of UV cure.

In the curable composition described above, the (meth)acrylic-modified siloxane compound (A) is typically present in an amount of 0.5 to 60% by weight based on the curable components excluding non-reaction-participant components, that is, based on the total weight of components (A), (B1) and (B2). The amount of siloxane compound (A) is preferably 1 to 30%, and more preferably 5 to 20% by weight. It is noted that optional components (C1) and (C2) are excluded from the curable components in the curable composition although strictly stated, they belong to the reaction-participant components.

If the amount of siloxane compound (A) is less than 0.5 wt % based on the total of components (A), (B1) and (B2), the cured composition may fail to exert the siloxane intrinsic properties. If the amount of siloxane compound (A) is more than 60 wt %, the cured composition in film form may become too soft, with its properties deviating from the desired film properties.

When the cured composition is in film form, a suitable coating method capable of forming a layer to a uniform thickness may be selected. The uncured composition may be coated by any of well-known methods such as screen printing, spray coating, and dipping.

On use of the (meth)acrylic-modified siloxane compound (A) and the curable composition comprising the same, there are obtained advantages that the (meth)acrylic-modified siloxane compound is highly compatible with components of the curable composition, and the cured composition exhibits full intrinsic properties of siloxane such as water repellent, antifouling and lubricating properties.

The curable composition having such advantages finds use as acrylic and urethane-based antifouling coating compositions and acrylic and polycarbonate-based transparent coating compositions for electronic parts.

EXAMPLE

Examples of the invention are given below by way of illustration and not by way of limitation.

Synthesis Example 1-1

A vessel was charged with 535 g of toluene, 700 g of a diol-modified silicone of the formula (17) shown below (OH value ~35 mg KOH/g), 0.80 g of dibutylhydroxytoluene, and 59 g of triethylamine. To the vessel heated at an internal temperature of 60° C., 40 g (0.44 mole) of acrylic chloride was added dropwise. At the end of dropwise addition, the unreacted acrylic chloride was treated with methanol, the neutralization salt formed was filtered, and the reaction solvent and unreacted reactants were distilled off in vacuum, yielding the end compound.

(17)

Herein, i=60.

For identification purposes, the end compound was analyzed by NMR and IR spectroscopy.

Figure 1:
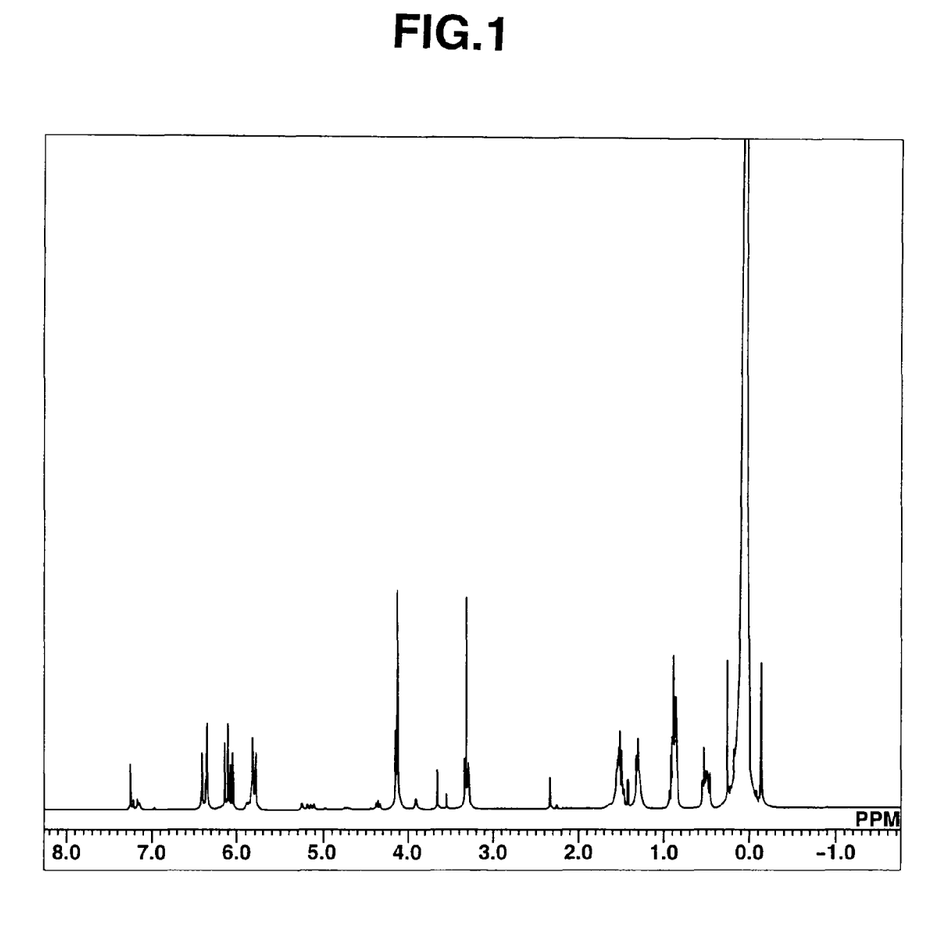
FIG. 1 is an NMR spectrum of the siloxane compound in Synthesis Example 1-1.
Figure 2:
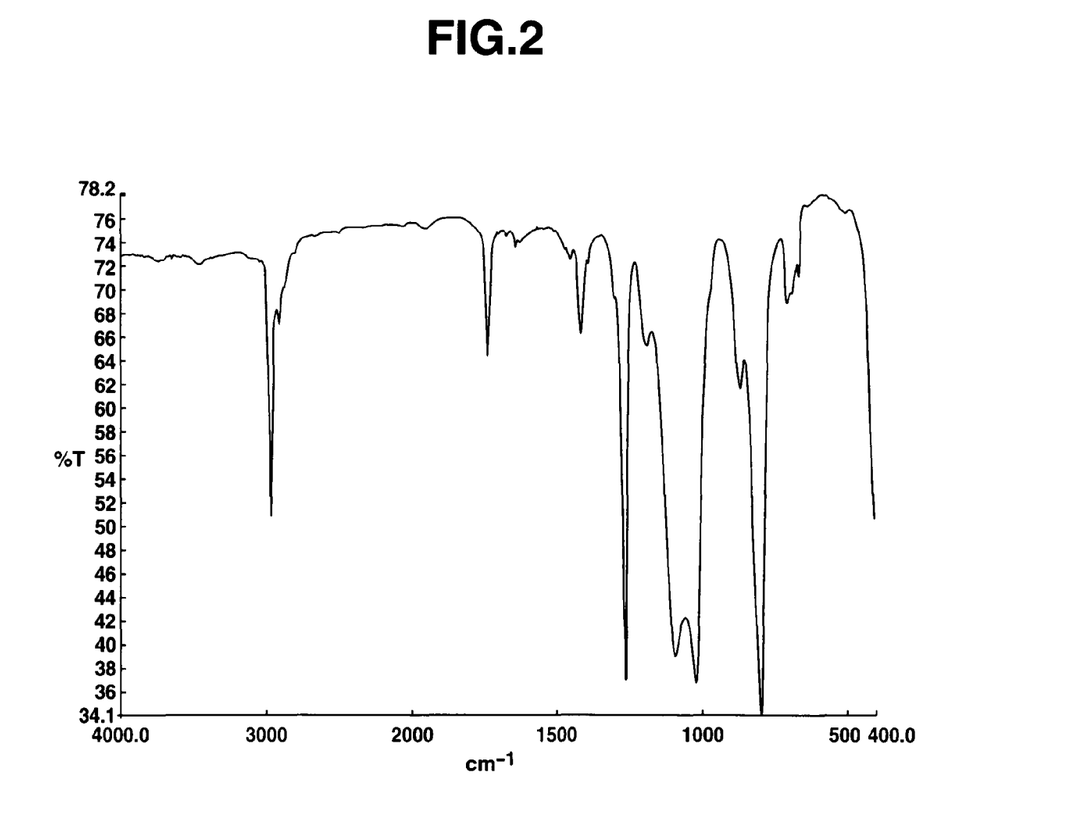
FIG. 2 is an IR spectrum of the siloxane compound in Synthesis Example 1-1.

FIG. 1 shows a $^1$H-NMR spectrum and Table 1 reports the assignment of peaks in $^1$H-NMR. FIG. 2 shows an IR spectrum.

TABLE 1

| δ (ppm) | |
|---|---|
| 6.40 | —O—(C=O)—CH=CH$_2$ group |
| 6.11 | |
| 5.80 | |
| 4.30 | —CH$_2$O— |
| 3.66 | |
| 1.56 | C$_4$H$_9$— group |
| 1.31 | C$_2$H$_5$— group |
| 0.87 | |
| 0.50 | |
| 3.32 | —SiCH$_2$CH$_2$CH$_2$O— |
| 1.31 | |
| 0.50 | |
| 0.05 | —Si—CH$_3$ |

From the results of NMR and IR analyses, the end compound was identified to have the following structural formula (18).

(18)

Herein, i=60.

Synthesis Example 1-2

The procedure of Synthesis Example 1-1 was repeated except that a polyether-modified silicone of formula (17) wherein a degree of polymerization is 30 was used. There was obtained a compound of formula (18) wherein i=30.

Synthesis Examples 1-3 and 1-4

The procedure of Synthesis Example 1-1 was repeated except that Synthesis Example 1-3 used a silicone of formula (17) wherein i=5 and Synthesis Example 1-4 used a silicone of formula (17) wherein i=300. There were obtained compounds of formula (18) wherein i=5 and 300.

Synthesis Example 2-1

A vessel was charged with 350 g of toluene, 500 g of a polyether-modified silicone of the formula (19) shown below (OH value ~11 mg KOH/g), 0.52 g of dibutylhydroxytoluene, and 12 g of triethylamine. To the vessel heated at an internal temperature of 60° C., 8.8 g (0.10 mole) of acrylic chloride was added dropwise. At the end of dropwise addition, the unreacted acrylic chloride was treated with methanol, the neutralization salt formed was filtered, and the reaction solvent and unreacted reactants were distilled off in vacuum, yielding the end compound.

(19)

Herein, i=60 and j=10.

For identification purposes, the end compound was analyzed by NMR and IR spectroscopy.

Figure 3:
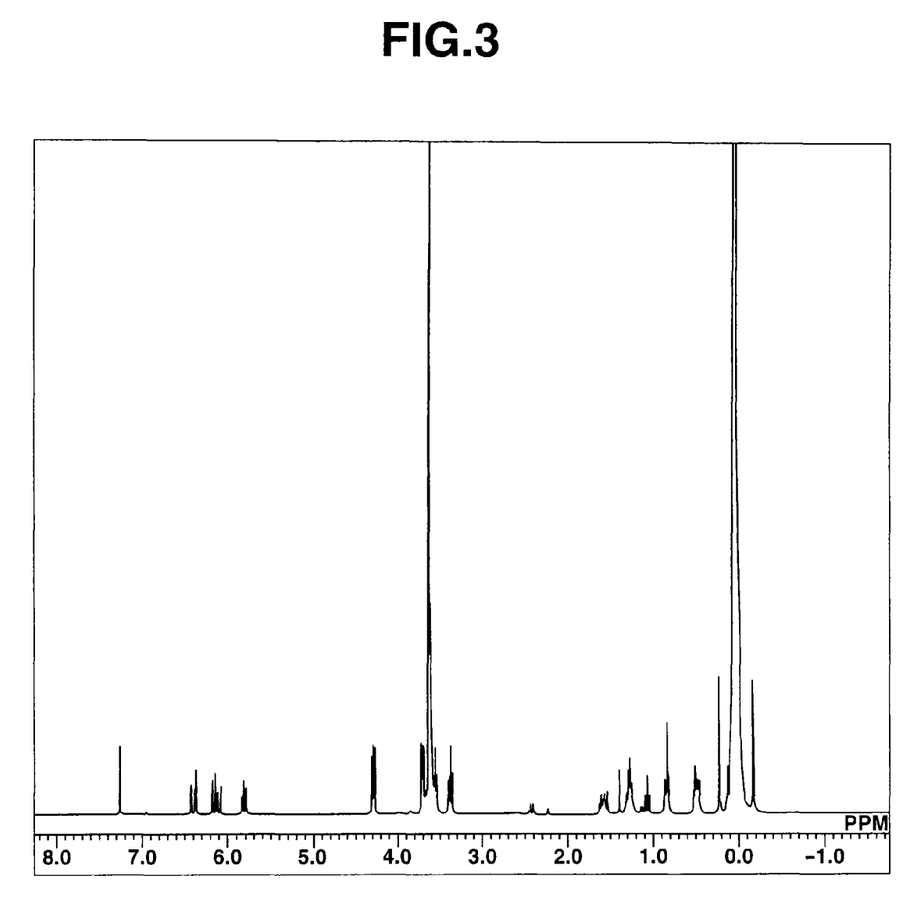
FIG. 3 is an NMR spectrum of the siloxane compound in Synthesis Example 2-1.
Figure 4:
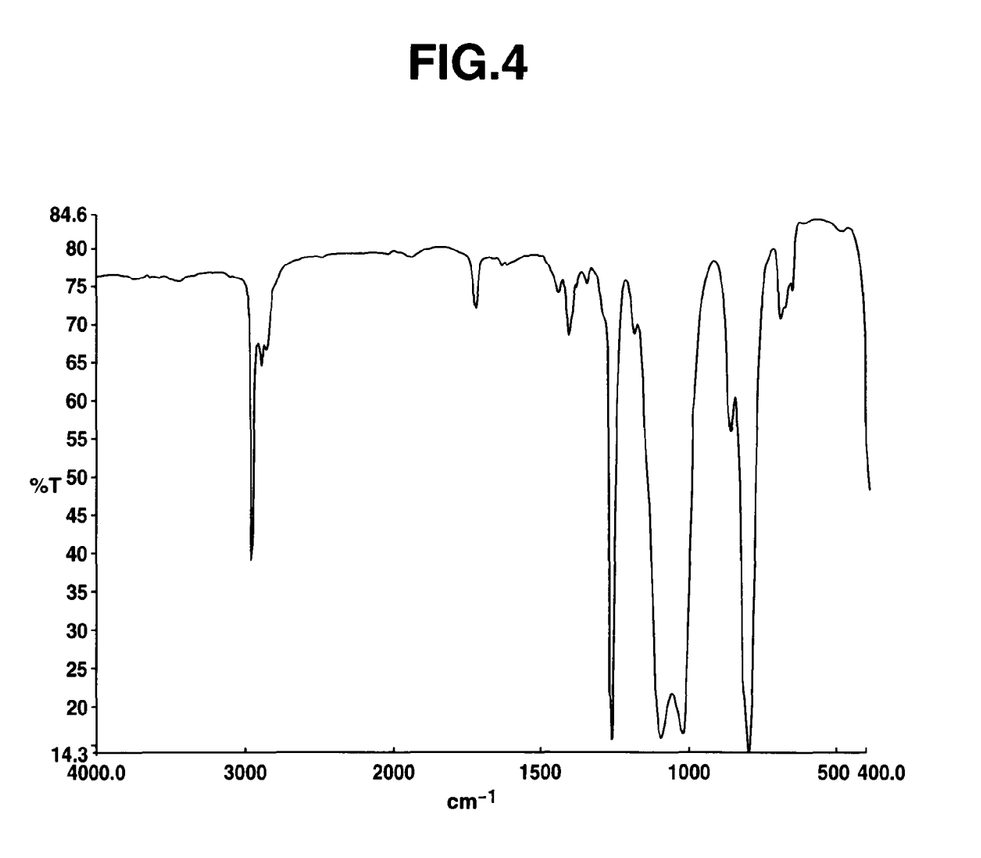
FIG. 4 is an IR spectrum of the siloxane compound in Synthesis Example 2-1.

FIG. 3 shows a $^1$H-NMR spectrum and Table 2 reports the assignment of peaks in $^1$H-NMR. FIG. 4 shows an IR spectrum.

TABLE 2

| δ (ppm) | |
|---|---|
| 6.40 | —O—(C=O)—CH=CH$_2$ group |
| 6.14 | |
| 5.78 | |
| 4.29 | —CH$_2$CH$_2$O— |
| 3.67 | |
| 1.56 | C$_4$H$_9$— group |
| 1.30 | |
| 0.85 | |
| 0.51 | |
| 3.39 | —SiCH$_2$CH$_2$CH$_2$O— |
| 1.30 | |
| 0.50 | |
| 0.05 | —Si—CH$_3$ |

From the results of NMR and IR analyses, the end compound was identified to have the following structural formula (20).

(20)

Herein, i=60, j=10, HLB=~1.7.

Synthesis Example 2-2

The procedure of Synthesis Example 2-1 was repeated except that a polyether-modified silicone of formula (19) wherein a degree of polymerization is 6 was used. There was obtained a compound of formula (20) wherein i=5. It had a HLB of about 8.

Synthesis Examples 2-3 and 2-4

The procedure of Synthesis Example 2-1 was repeated except that Synthesis Example 2-3 used a silicone of formula (19) wherein i=1 and Synthesis Example 2-4 used a silicone of formula (19) wherein i=300. There were obtained compounds of formula (20) wherein i=1 and 300. They had a HLB of about 12 and about 0.4, respectively.

Synthesis Example 3-1

A vessel was charged with 360 g of toluene, 500 g of a polyether-modified silicone of the formula (21) shown below (OH value ~22 mg KOH/g), 0.54 g of dibutylhydroxytoluene, and 24 g of triethylamine. To the vessel heated at an internal temperature of 60° C., 18 g (0.20 mole) of acrylic chloride was added dropwise. At the end of dropwise addition, the unreacted acrylic chloride was treated with methanol, the neutralization salt formed was filtered, and the reaction solvent and unreacted reactants were distilled off in vacuum, yielding the end compound.

(21)

Herein, i=60 and j=10.

For identification purposes, the end compound was analyzed by NMR and IR spectroscopy.

Figure 5:
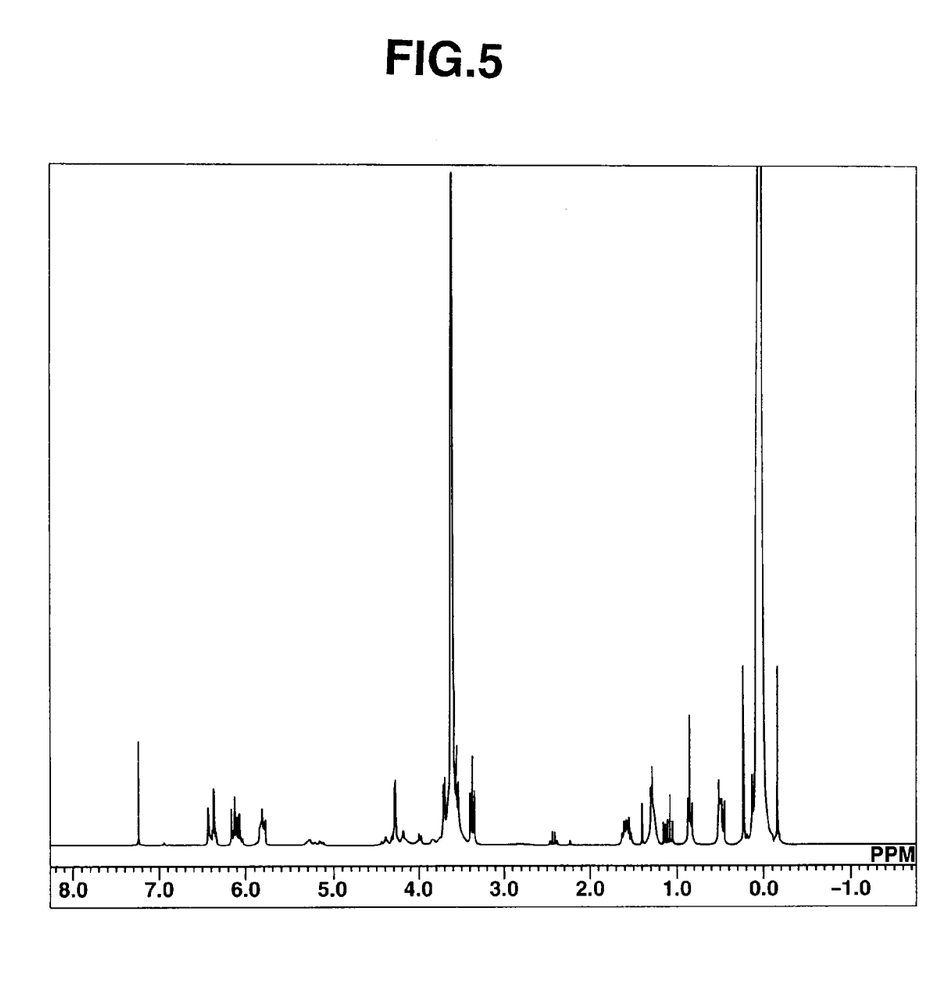
FIG. 5 is an NMR spectrum of the siloxane compound in Synthesis Example 3-1.
Figure 6:
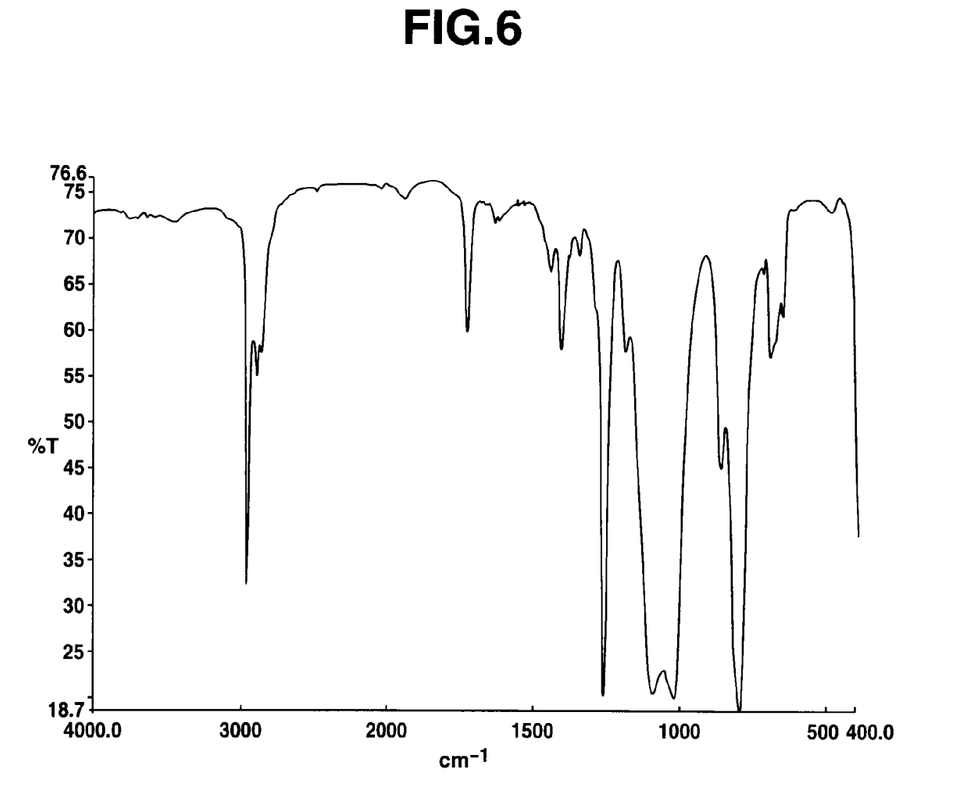
FIG. 6 is an IR spectrum of the siloxane compound in Synthesis Example 3-1.

FIG. 5 shows a $^1$H-NMR spectrum and Table 3 reports the assignment of peaks in $^1$H-NMR. FIG. 6 shows a IR spectrum.

TABLE 3

| δ (ppm) | |
|---|---|
| 6.40 | —O—(C=O)—CH=CH$_2$ group |
| 6.11 | |
| 5.80 | |
| 4.30 | —CH$_2$CH$_2$O— |
| 3.66 | —CH$_2$—CH(O—)—CH$_2$— |
| 1.55 | C$_4$H$_9$— group |
| 1.30 | |
| 0.88 | |
| 0.50 | |
| 3.36 | —SiCH$_2$CH$_2$CH$_2$O— |
| 0.88 | |
| 0.50 | |
| 0.05 | —Si—CH$_3$ |

From the results of NMR and IR analyses, the end compound was identified to have the following structural formula (22).

(22)

Herein, i=60, j=10, HLB=~1.7.

Synthesis Example 3-2

The procedure of Synthesis Example 3-1 was repeated except that a polyether-modified silicone of formula (21) wherein a degree of polymerization is 6 was used. There was obtained a compound of formula (22) wherein i=5. It had a HLB of about 7.

Synthesis Examples 3-3 and 3-4

The procedure of Synthesis Example 3-1 was repeated except that Synthesis Example 3-3 used a silicone of formula (21) wherein i=1 and Synthesis Example 3-4 used a silicone of formula (21) wherein i=300. There were obtained compounds of formula (22) wherein i=1 and 300. They had a HLB of about 10 and about 0.4, respectively.

Example 1-1

On a weight basis, 10% of the siloxane of Synthesis Example 1-1, 45% of methyl acrylate, and 45% of methyl methacrylate were mixed, and 2% based on the mixture of Darocure 1173 (Ciba Geigy) was added thereto as a photoinitiator. The resulting mixture was coated onto a glass plate and cured in a UV irradiation unit (two lamps with a dose of 120 W/cm, irradiation rate 5 m/min, irradiation time 1 minute). The cured film was examined for physical properties.

Examples 1-2 to 3-4

Examples 1-2 to 1-4, 2-1 to 2-4, and 3-1 to 3-4 used the siloxanes of corresponding Synthesis Examples. Cured films were formed as in Example 1-1, by mixing the siloxane with methyl acrylate (MA), methyl methacrylate (MM) and optionally, hydroxyethyl methacrylate (HEMA) in accordance with the formulation of Table 4.

Comparative Example 1

As in Example 1-1, a cured film was formed by mixing a single end methacrylic-modified siloxane of the structural formula (23) below with methyl acrylate and methyl methacrylate in accordance with the formulation of Table 4.

(23)

Comparative Example 2

As in Example 1-1, a cured film was formed by mixing a single end polyether-modified siloxane of the structural formula (24) below with methyl acrylate and methyl methacrylate in accordance with the formulation of Table 4.

(24)

Comparative Example 3

As in Example 1-1, a cured film was formed by mixing a single end methacrylic-modified siloxane of the structural formula (25) below with methyl acrylate and methyl methacrylate in accordance with the formulation of Table 4.

(25)

Comparative Examples 4 and 5

Comparative Examples 4 and 5 used siloxanes prepared as in Synthesis Example 1 wherein the value of i is beyond the range of the invention. As in Example 1-1, a cured film was formed by mixing the siloxane with methyl acrylate, methyl methacrylate and hydroxyethyl methacrylate (HEMA) in accordance with the formulation of Table 4.

The cured film-bearing samples were evaluated for transparency and marker wipe-off.

Transparency

The sample was visually observed and rated according to the following criterion.

○: fully transparent
Δ: locally cloudy
x: cloudy on entire surface

Marker Wipe-Off

The sample was marked with straight lines using a red marker pen (Magic Ink®), wiped with dry cloth, and rated according to the following criterion.

○: marks could be lightly wiped off even after more than 10 cycles of marking and wiping repeated
Δ: even after several cycles of marking and wiping repeated, marks could be wiped off, but some traces left
x: not wiped off Japanese Patent Application No. 2008-115740 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. The (meth)acrylic-modified siloxane compound having the structural formula (2) or (3):

TABLE 4

| | | Siloxane | | | MA (%) | MM (%) | HEMA (%) | Transparency | Marker wipe-off |
|---|---|---|---|---|---|---|---|---|---|
| | | Structure | Value of i | HLB (%) | | | | | |
| Example | 1-1 | Formula (18) | 60 | — | 10 | 45 | 45 | — | ○ | ○ |
| | 1-2 | Formula (18) | 30 | — | 20 | 40 | 40 | — | ○ | ○ |
| | 1-3 | Formula (18) | 5 | — | 20 | 30 | 30 | 20 | ○ | ○ |
| | 1-4 | Formula (18) | 300 | — | 5 | 35 | 35 | 25 | ○ | ○ |
| | 2-1 | Formula (20) | 60 | 1.7 | 10 | 45 | 45 | — | ○ | ○ |
| | 2-2 | Formula (20) | 5 | 8 | 20 | 40 | 40 | — | ○ | ○ |
| | 2-3 | Formula (20) | 1 | 12 | 20 | 30 | 30 | 25 | ○ | Δ |
| | 2-4 | Formula (20) | 300 | 0.4 | 5 | 35 | 35 | 25 | Δ | ○ |
| | 3-1 | Formula (22) | 60 | 1.7 | 10 | 45 | 45 | — | ○ | ○ |
| | 3-2 | Formula (22) | 5 | 7 | 20 | 40 | 40 | — | ○ | ○ |
| | 3-3 | Formula (22) | 1 | 10 | 20 | 30 | 30 | 20 | ○ | ○ |
| | 3-4 | Formula (22) | 300 | 0.4 | 5 | 35 | 35 | 25 | Δ | ○ |
| Comparative Example | 1 | Formula (23) | 60 | — | 10 | 45 | 45 | — | X | ○ |
| | 2 | Formula (24) | 60 | 0.2 | 10 | 45 | 45 | — | ○ | X |
| | 3 | Formula (25) | 60 | 3.1 | 10 | 45 | 45 | — | ○ | Δ |
| | 4 | Formula (18) | 1 | 2.5 | 20 | 30 | 30 | 20 | ○ | X |
| | 5 | Formula (18) | 500 | 0.02 | 5 | 35 | 35 | 25 | X | ○ |

(2)

wherein $R^1$ is each independently a monovalent $C_1$-$C_{30}$ organic group, $R^4$ is hydrogen or methyl, and i has a value from 1 to 500, (3)

wherein $R^1$ is each independently a monovalent $C_1$-$C_{30}$ organic group, $R^4$ is hydrogen or methyl, and i has a value from 1 to 500.

2. The (meth)acrylic-modified siloxane compound of claim 1, having a HLB value of up to 12.

3. A curable composition comprising the (meth)acrylic-modified siloxane compound of claim 1.

4. The curable composition of claim 3 wherein the siloxane compound is present in an amount of 0.5 to 60% by weight based on curable components excluding non-reaction-participant components.

5. The curable composition of claim 3 which is an antifouling coating composition or a transparent coating composition for electronic materials.

6. The (meth)acrylic-modified siloxane compound of claim 1, which has the structural formula (2).

7. The (meth)acrylic-modified siloxane compound of claim 1, which has the structural formula (3).

8. The (meth)acrylic-modified siloxane compound having the structural formula (4) or (5):

(4)

wherein $R^1$ is each independently a monovalent $C_1$-$C_{30}$ organic group, $R^2$ is $C_2$-$C_6$ oxyalkylene, $R^4$ is hydrogen or methyl, and i has a value from 1 to 500, j and k each have a value of 0 to 60 and j and k may be the same or different, but are not equal to 0 at the same time, (5)

wherein $R^1$ is each independently a monovalent $C_1$-$C_{30}$ organic group, $R^2$ is $C_2$-$C_6$ oxyalkylene, $R^4$ is hydrogen or methyl, and i has a value from 1 to 500, j and k each have a value of 0 to 60 and j and k may be the same or different, but are not equal to 0 at the same time.

* * * * *